(12) United States Patent
Ratasuk et al.

(10) Patent No.: US 12,047,314 B2
(45) Date of Patent: Jul. 23, 2024

(54) CONTROL RESOURCE SET COMBINING FOR REDUCED CAPABILITY DEVICES

(71) Applicant: Nokia Technologies Oy, Espoo (FI)

(72) Inventors: Rapeepat Ratasuk, Inverness, IL (US); Nitin Mangalvedhe, Hoffman Estates, IL (US); Man Hung Ng, Swindon (GB)

(73) Assignee: Nokia Technologies Oy, Espoo (FI)

( * ) Notice: Subject to any disclaimer, the term of this patent is extended or adjusted under 35 U.S.C. 154(b) by 434 days.

(21) Appl. No.: 17/470,065

(22) Filed: Sep. 9, 2021

(65) Prior Publication Data
US 2023/0074205 A1    Mar. 9, 2023

(51) Int. Cl.
*H04L 5/00* (2006.01)
*H04W 72/0453* (2023.01)
*H04W 72/23* (2023.01)

(52) U.S. Cl.
CPC .......... *H04L 5/0048* (2013.01); *H04L 5/0041* (2013.01); *H04W 72/0453* (2013.01); *H04W 72/23* (2023.01)

(58) Field of Classification Search
CPC ... H04L 5/0048; H04L 5/0041; H04L 5/0053; H04L 5/0064; H04L 5/0092; H04L 5/001; H04L 5/0023; H04W 72/0453; H04W 72/23; H04W 72/569
See application file for complete search history.

(56) References Cited

U.S. PATENT DOCUMENTS

| 2014/0348077 A1* | 11/2014 | Chen | H04L 25/0202 |
| | | | 370/329 |
| 2015/0382349 A1* | 12/2015 | Zhao | H04W 48/06 |
| | | | 370/336 |
| 2018/0199343 A1* | 7/2018 | Deogun | H04L 5/0044 |

(Continued)

FOREIGN PATENT DOCUMENTS

WO    WO-2020/258216 A1    12/2020

OTHER PUBLICATIONS

"3GPP Release 18 TSG SA Status of Rel-18 work", https://www.3gpp.org/release-18, Sep. 2021, 2 pgs.

(Continued)

*Primary Examiner* — Will W Lin
(74) *Attorney, Agent, or Firm* — Harrington & Smith (57) ABSTRACT

Example embodiments of the invention provide at least a method and apparatus to perform at least determining, by a user equipment of a communication network, information comprising a plurality of frequency ranges of a transmission; receiving, by the user equipment, the plurality of frequency ranges of the transmission distributed over different time slots monitored by the user equipment; and combining, by the user equipment, the received plurality of frequency ranges to derive content of the transmission. Further, to perform at least determining, by a network device of a communication network, information comprising a plurality of frequency ranges of a transmission; and sending, by the network device, to user equipment of the communication (Continued)

---

DETERMINING, BY A USER EQUIPMENT OF A COMMUNICATION NETWORK, INFORMATION COMPRISING A PLURALITY OF FREQUENCY RANGES OF A TRANSMISSION — 910

RECEIVING, BY THE USER EQUIPMENT, THE PLURALITY OF FREQUENCY RANGES OF THE TRANSMISSION DISTRIBUTED OVER DIFFERENT TIME SLOTS MONITORED BY THE USER EQUIPMENT — 920

COMBINING, BY THE USER EQUIPMENT, THE RECEIVED PLURALITY OF FREQUENCY RANGES TO DERIVE CONTENT OF THE TRANSMISSION — 930 network the plurality of frequency ranges of the transmission distributed over different time slots monitored by the user equipment for causing combining at the user equipment to derive content of the transmission.

20 Claims, 8 Drawing Sheets

(56) References Cited

U.S. PATENT DOCUMENTS

| | | | | |
|---|---|---|---|---|
| 2019/0150073 A1* | 5/2019 | Tiirola | ............... | H04W 72/044 455/434 |
| 2019/0380142 A1* | 12/2019 | Wang | ................ | H04W 72/20 |
| 2020/0029346 A1* | 1/2020 | Falahati | ............ | H04W 72/0446 |
| 2020/0052844 A1* | 2/2020 | Yu | ..................... | H04L 5/0053 |
| 2020/0092868 A1* | 3/2020 | Guthmann | ........... | H04L 1/1614 |
| 2020/0120678 A1* | 4/2020 | Zhou | ................ | H04W 72/1215 |
| 2021/0044380 A1* | 2/2021 | Ly | ....................... | H04L 5/0053 |
| 2021/0045099 A1 | 2/2021 | Shin et al. | ....................... | 72/42 |
| 2022/0201666 A1* | 6/2022 | Harada | ............. | H04W 72/044 |
| 2022/0417911 A1* | 12/2022 | Kwak | ................... | H04W 72/23 |
| 2023/0209568 A1* | 6/2023 | Song | ................ | H04W 72/0446 370/329 |

OTHER PUBLICATIONS

"3GPP Release 17 Some Background on Release 17", https://.3gpp.org/release-17, Sep. 2021, 2 pgs.

"3GPP TS 38.213 V16.6.0, 3rd Generation Partnership Project; Technical Specification Group Radio Access Network; NR; Physical layer procedures for control (Release 16)", Jun. 2021, 187 pgs.

"3GPP TS 38.214 V16.6.0, 3rd Generation Partnership Project; Technical Specification Group Radio Access Network; NR; Physical layer procedures for data (Release 16)", Jun. 2021, 172 pgs.

* cited by examiner

|  | FR1 | | FR2 | |
|---|---|---|---|---|
|  | REFERENCE NR UE | RedCap UE | REFERENCE NR UE | RedCap UE |
| DEVICE BANDWIDTH | 100 MHz | 20 MHz | 200 MHz | 100 MHz |
| ANTENNA CONFIG | FDD: 1Tx-2Rx<br>TDD: 1Tx-4Rx | 1Tx-1Rx, 1Tx-2Rx | 1Tx-2Rx | 1Tx-1Rx<br>1Tx-2Rx |
| DL MIMO SUPPORT | YES | YES FOR 2Rx | YES | YES FOR 2Rx |
| DUPLEX OPERATION | FD-FDD, TDD | FD-FDD, TDD, HD-FDD | TDD | TDD |
| MAXIMUM MODULATION | DL: 256-QAM<br>UL: 64-QAM | DL: 256-QAM (OPTIONAL), 64-QAM MANDATORY<br>UL: 64-QAM | DL: 64-QAM<br>UL: 64-QAM | DL: 64-QAM<br>UL: 64-QAM |
| PEAK DATA RATES | N/A | FD-FDD, 1Rx: 85 Mbps DL, 91 Mbps UL | N/A | 50:50 DL/UL, 1Rx: 212 Mbps DL, 228 Mbps UL |
| COMPLEXITY REDUCTION | - | ~50-60% (1Rx) | - | ~50% (1Rx) |

CONTROL RESOURCE SET COMBINING FOR REDUCED CAPABILITY DEVICES

TECHNICAL FIELD

The teachings in accordance with the exemplary embodiments of this invention relate generally to mapping control resource set and system information and, more specifically, relate to mapping control resource set and system information segments for combining by reduced capability devices.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
3GPP 3rd Generation Partnership Project
BW Bandwidth
BWP Bandwidth Part
CORESET Control resource set
DCI Downlink control information
DL Downlink
DRX Discontinuous reception
FR1 Frequency range 1
FR2 Frequency range 2
gNB Next generation Node B
MIB Master Information Block
PDCCH Physical downlink control channel
PDSCH Physical downlink shared channel
PUSCH Physical uplink shared channel
RedCap Reduced Capability
RRC Radio Resource Control
RS Reference signals
SIB System Information Block
SR Scheduling Request
SSB Synchronization signal block
UE User equipment
UL Uplink At the time of this application, as the demand for radio access continues to increase, there exists a need for further improvements in different aspects of communication systems including improving data rate, latency, reliability, and/or mobility for wireless communication for cellular wireless communication systems, such as for 5G NR. Such improvements relate to operation communication improvements for reduced capability (RedCap) devices.

Example embodiments of the invention work to further improve at least such operations.

SUMMARY

This section contains examples of possible implementations and is not meant to be limiting.

In an example aspect of the invention, there is an apparatus, such as a user equipment side apparatus, comprising: at least one processor; and at least one memory including computer program code, where the at least one memory and the computer program code are configured, with the at least one processor, to cause the apparatus to at least: determine, by a user equipment of a communication network, information comprising a plurality of frequency ranges of a transmission; receive, by the user equipment, the plurality of frequency ranges of the transmission distributed over different time slots monitored by the user equipment; and combine, by the user equipment, the received plurality of frequency ranges to derive content of the transmission.

In accordance with another example aspect of the invention there is a method comprising: determining, by a user equipment of a communication network, information comprising a plurality of frequency ranges of a transmission; receiving, by the user equipment, the plurality of frequency ranges of the transmission distributed over different time slots monitored by the user equipment; and combining, by the user equipment, the received plurality of frequency ranges to derive content of the transmission.

A further example embodiment is an apparatus and a method comprising the apparatus and the method of the previous paragraph, wherein content of the transmission comprises a physical downlink control channel for scheduling a physical downlink shared channel and the physical downlink shared channel, and wherein the different time slots are consecutive or non-consecutive to one another, wherein determining the information comprising the plurality of frequency ranges depends on a control resource set indicated in a system information, at least one search space indicated in the system information, and a bandwidth of the user equipment, where a bandwidth of the control resource set is larger than the bandwidth of the user equipment, wherein the determining comprises determining a number of the plurality of frequency ranges as M/N, wherein the plurality of the frequency ranges are aggregated over different time periods that may be consecutive or non-consecutive to one another, wherein M is based on the indication in the system information, and wherein N is known to the user equipment, wherein determining the information comprising the plurality of frequency ranges comprises: determining control channel elements mapped to the M physical resource blocks in the control resource set; determining a frequency range of M physical resource blocks from the system information for the control resource set; and determining frequency range of N physical resource blocks, wherein N is based on the bandwidth of the user equipment, within the frequency range of M physical resource blocks, wherein the plurality of frequency ranges are received in a successive more than one search space spread over more than one slot, wherein based on the successive more than one search space being in a single slot the user equipment is utilizing one search space in the single slot or the successive more than one search space at a higher periodicity, wherein a physical downlink control channel is fully contained within a single narrowband segment corresponding to one search space of the successive more than one search space for lower aggregation levels, wherein the plurality of frequency ranges are corresponding to the successive more than one search space and are spread across the more than one slot for higher aggregation levels, wherein the combining comprises tuning to a different frequency range of the successive more than one search space to capture additional frequency ranges, wherein the tuning is to a center frequency of a frequency range starting from a lowest number physical resource block of the physical resource blocks, wherein the tuning to the center frequency of a frequency range is at a search space instance that is one of k+1 or k+M/N−1, wherein k, M, and N are integers, wherein the tuning is based on at least one of a frequency or time resource allocation provided in the plurality of frequency ranges, and/or wherein the plurality of frequency ranges is received from a network node of the communication network.

A non-transitory computer-readable medium storing program code, the program code executed by at least one processor to perform at least the method as described in the paragraphs above.

In another example aspect of the invention, there is an apparatus comprising: means for determining, by a user equipment of a communication network, information comprising a plurality of frequency ranges of a transmission; means for receiving, by the user equipment, the plurality of frequency ranges of the transmission distributed over different time slots monitored by the user equipment; and means for combining, by the user equipment, the received plurality of frequency ranges to derive content of the transmission.

In accordance with the example embodiments as described in the paragraph above, at least the means for determining, receiving, and combining comprises a network interface, and computer program code stored on a computer-readable medium and executed by at least one processor.

In an example aspect of the invention, there is an apparatus, such as a network side apparatus, comprising: at least one processor; and at least one memory including computer program code, where the at least one memory and the computer program code are configured, with the at least one processor, to cause the apparatus to at least: determine, by a network device of a communication network, information comprising a plurality of frequency ranges of a transmission; send, by the network device, to user equipment of the communication network the plurality of frequency ranges of the transmission distributed over different time slots monitored by the user equipment for causing combining at the user equipment to derive content of the transmission.

In accordance with another example aspect of the invention there is a method comprising: determining, by a network device of a communication network, information comprising a plurality of frequency ranges of a transmission; and sending, by the network device, to user equipment of the communication network the plurality of frequency ranges of the transmission distributed over different time slots monitored by the user equipment for causing combining at the user equipment to derive content of the transmission.

A further example embodiment is an apparatus and a method comprising the apparatus and the method of the previous paragraph, wherein the content of the transmission comprises a physical downlink control channel for scheduling a physical downlink shared channel and the physical downlink shared channel, and wherein the different time slots are consecutive or non-consecutive to one another, wherein determining the information comprising the plurality of frequency ranges depends on a control resource set indicated in system information, at least one search space indicated in the system information, and a bandwidth of the control resource set, where a bandwidth of the control resource set is larger than the bandwidth of the user equipment, wherein the determining comprises determining a number of the plurality of frequency ranges as M/N, wherein the plurality of the frequency ranges are aggregated over different time periods that may be consecutive or non-consecutive to one another, wherein M is based on the indication in the system information, and wherein the N is known to the user equipment, wherein determining the information comprising the plurality of frequency ranges comprises: determining control channel elements mapped to the M physical resource blocks in the control resource set; determining a frequency range of M physical resource blocks from the system information for the control resource set; and determining frequency range of N physical resource blocks, wherein N is based on the bandwidth of the user equipment, within the frequency range of M physical resource blocks, wherein the plurality of frequency ranges are transmitted in more than one search space of the at least one search space spread over more than one slot, wherein based on the successive more than one search space being in a single slot one search space is for utilization in the single slot or the successive more than one search space is for utilization at a higher periodicity, wherein a physical downlink control channel is fully contained within a single narrowband segment corresponding to one search space of the successive more than one search space for lower aggregation levels, wherein the plurality of frequency ranges are corresponding to the successive more than one search space and are spread across the more than one slot for higher aggregation levels, wherein the information is causing tuning to a different frequency range of the successive more than one search space to capture additional frequency ranges, wherein the tuning is based on at least one of a frequency or time resource allocation provided in the plurality of frequency ranges, wherein the plurality of frequency ranges is transmitted from the network node to the user equipment, and/or wherein a system information is transmitted over the physical downlink shared channel.

A non-transitory computer-readable medium storing program code, the program code executed by at least one processor to perform at least the method as described in the paragraphs above.

In another example aspect of the invention, there is an apparatus comprising: means for determining, by a network device of a communication network, information comprising a plurality of frequency ranges of a transmission; and means for sending, by the network device, to user equipment of the communication network the plurality of frequency ranges of the transmission distributed over different time slots monitored by the user equipment for causing combining at the user equipment to derive content of the transmission.

In accordance with the example embodiments as described in the paragraph above, at least the means for determining, and sending comprises a network interface, and computer program code stored on a computer-readable medium and executed by at least one processor.

A communication system comprising the user equipment side apparatus and the network side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

In example embodiments of the invention there is provided improvements for reduced capability (RedCap) network devices, including operations of mapping control resource set and system information segments for combining by reduced capability devices. It is note that in accordance with example embodiments of the invention any reference to "system information" in this paper can be a reference to master information block(s) and/or system information block(s).

Figure 1:
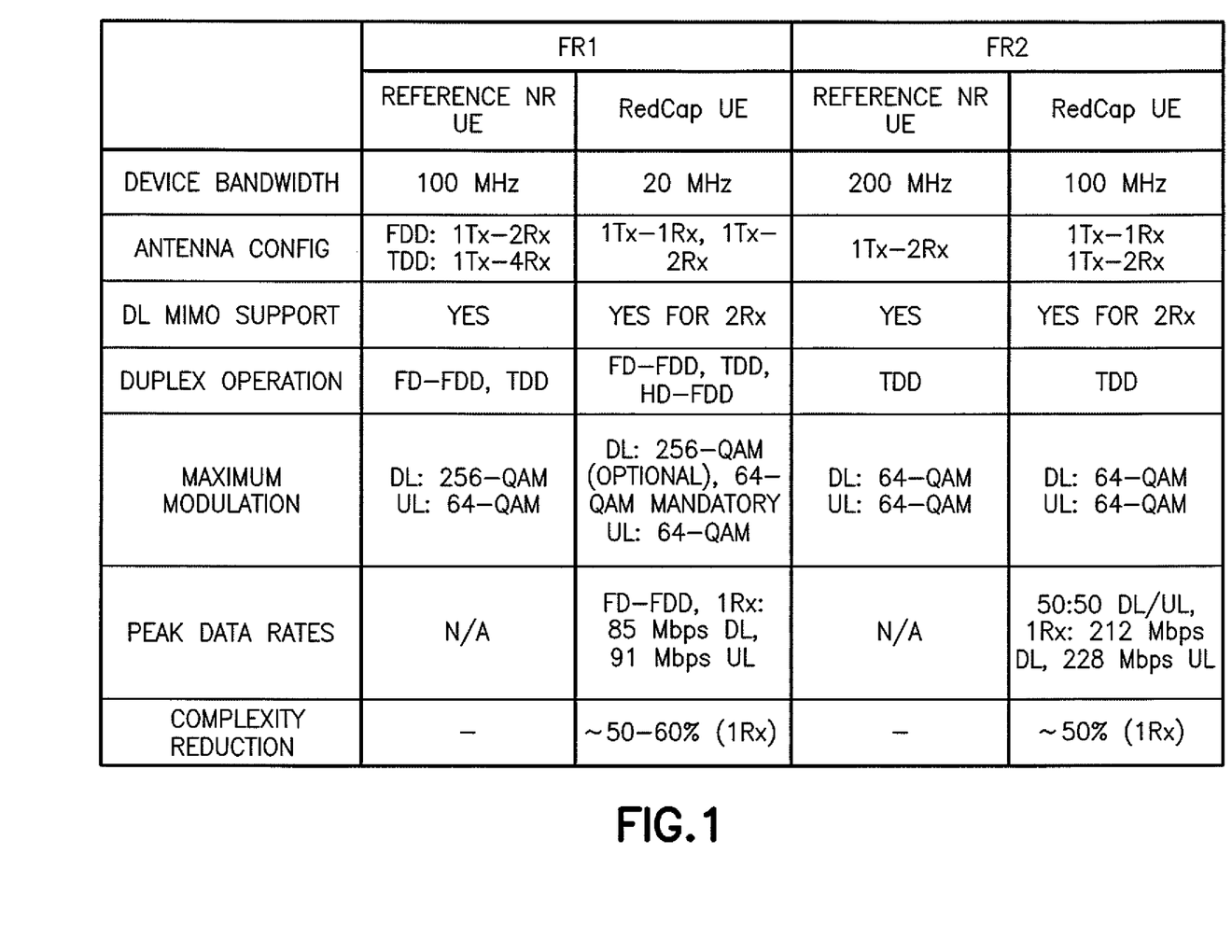
FIG. 1 shows a Table Summary of Rel-17 RedCap UE.

In Rel-17, Reduced Capability (RedCap) NR devices are being introduced. RedCap devices have lower cost and complexity compared to other NR devices and are intended for IoT use cases such as industrial sensors, wearables, and video transmissions. A summary of RedCap UE being specified in Rel-17 is provided in the Table Summary of FIG. 1. In Rel-17, RedCap UE has maximum BW of 20 MHz in FR1 and 100 MHz in FR2. For FR1 FDD, RedCap UE with 1 receive antenna has peak data rates of 85 Mbps in the DL and 91 Mbps in the UL.

However, several IoT use cases intended for RedCap do not need such high data rates. For Rel-18, further enhancements for RedCap are being considered. One key proposal is to target substantial further reduction in device cost by reducing supported data rate, e.g., comparable to LTE Cat-1bis UE. This can be done by reducing the maximum supported bandwidth (e.g., to 5 MHz) as contributed by the Applicant.

In Rel-17, RedCap UE has maximum BW of 20 MHz in FR1. However, the system bandwidth can be significantly larger than the maximum RedCap UE BW. To support the use of large initial BWPs for non-RedCap UE, it has been agreed in 3GPP RAN1 that separate UL and DL BWPs can be configured for RedCap UE.

The initial access procedure for Rel-17 RedCap UE is then expected to include:

RedCap UE can monitor a configured CORESET and decode the corresponding SIB (for example CORESET #0 indicated in MIB and SIB1 transmitted on the PDSCH) within the maximum UE bandwidth (for example 20 MHz in FR1). SIB will indicate separate initial DL and UL BWPs for RedCap UE; and After SIB1 acquisition, RedCap UE can be move to its own initial DL and UL BWPs. Note that RedCap may be able to use the initial DL BWP even during random access, unlike non-RedCap UE that needs to remain within CORESET #0 frequency range until completion of random access procedure.

With the introduction of Rel-18 5 MHz RedCap UE, it would be beneficial to use the same CORESET and SIB for all UEs (i.e., Rel-18 5 MHz RedCap UE, Rel-17 20 MHz RedCap UE, and non-RedCap UE). However, it may not be feasible to configure CORESET and SIB to be 5 MHz or less as this might significantly reduce CORESET and SIB coverage and performance for all UEs.

Therefore, a method is needed such that legacy CORESET and SIB can still be used and for narrowband Rel-18 5 MHz RedCap UE to be able to decode the wideband CORESET and SIB.

In standards agreements at the time of this application, enhancement of PDCCH for increased reliability is being specified these agreements consider distributing a PDCCH across two different CORESETs corresponding to different TCI states (i.e., for different TRPs). Either one or two search space sets may be considered for the two CORESETs. Furthermore, options for both repetition in the two CORESETs as well as encoding across the two CORESETs are considered.

It is noted that prior art at the time of this application does not disclose remapping of the CCEs in a single CORESET within a reduced bandwidth over multiple search space sets or slots, where the remapping depends on both the size (frequency span) of the CORESET and the reduced bandwidth, and where the CCEs within the reduced bandwidth may occupy different frequencies in different slots.

One difference between operations as disclosed in this application and prior art at the time of this application is that, in the Applicant's proposals, the UE is combining different portions of the CORESET/SIB across the search space occasions instead of combining different search space sets/candidate sets.

Figure 8:
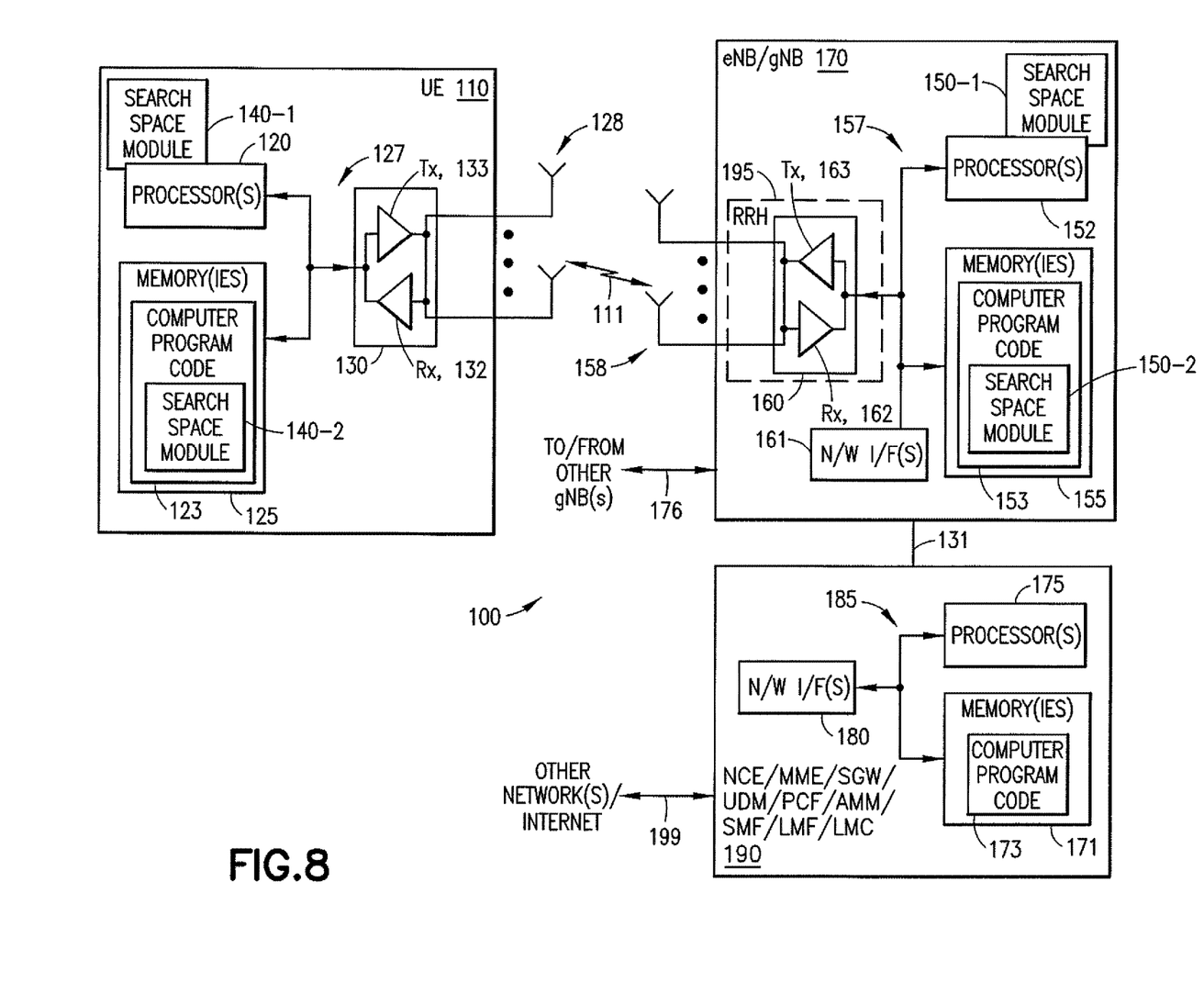
FIG. 8 shows a high level block diagram of various devices used in carrying out various aspects of the invention.

Before describing the example embodiments of the invention in further detail reference is made to FIG. 8. FIG. 8 shows a block diagram of one possible and non-limiting exemplary system in which the exemplary embodiments may be practiced.

As shown in FIG. 8, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include a search space 140 which is configured to perform the example embodiments of the invention as described herein. The search space module 140 may be implemented in hardware by itself of as part of the processors and/or the computer program code of the UE 110. The search space module 140 comprising one of or both parts 140-1 and/or 140-2, which may be implemented in a number of ways. The search space module 140 may be implemented in hardware as search space module 140-1, such as being implemented as part of the one or more processors 120. The search space module 140-1 may be implemented also as an integrated circuit or through other hardware such as a programmable gate array. In another example, the search space module 140 may be implemented as search space module 140-2, which is implemented as computer program code 123 and is executed by the one or more processors 120. Further, it is noted that the search space modules 140-1 and/or 140-2 are optional. For instance, the one or more memories 125 and the computer program code 123 may be configured, with the one or more processors 120, to cause the user equipment 110 to perform one or more of the operations as described herein. The UE 110 communicates with gNB 170 via a wireless link 111.

The gNB 170 (NR/5G Node B or possibly an evolved NB) is a base station (e.g., for LTE, long term evolution) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes a search space module 150 which is configured to perform example embodiments of the invention as described herein. The search space module 150 may comprise one of or both parts 150-1 and/or 150-2, which may be implemented in a number of ways. The search space module 150 may be implemented in hardware by itself or as part of the processors and/or the computer program code of the gNB 170. search space module 150-1, such as being implemented as part of the one or more processors 152. The search space module 150-1 may be implemented also as an integrated circuit or through other hardware such as a programmable gate array. In another example, the search space module 150 may be implemented as search space module 150-2, which is implemented as computer program code 153 and is executed by the one or more processors 152. Further, it is noted that the search space modules 150-1 and/or 150-2 are optional. For instance, the one or more memories 155 and the computer program code 153 may be configured to cause, with the one or more processors 152, the gNB 170 to perform one or more of the operations as described herein. The one or more network interfaces 161 communicate over a network such as via the links 176 and 131. Two or more gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

It is noted that description herein indicates that "cells" perform functions, but it should be clear that the gNB that forms the cell will perform the functions. The cell makes up part of a gNB. That is, there can be multiple cells per gNB.

The wireless include a network 100 may include a NCE/MME/SGW/UDM/PCF/AMM/SMF/LMF/LMC 190, which can comprise a network control element (NCE), and/or serving gateway (SGW) 190, and/or MME (Mobility Management Entity) and/or SGW (Serving Gateway) functionality, and/or user data management functionality (UDM), and/or PCF (Policy Control) functionality, and/or Access and Mobility (AMF) functionality, and/or Session Management (SMF) functionality, Location Management Function (LMF), Location Management Component (LMC) and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF/LMF/LMC 190 is configurable to perform operations in accordance with example embodiments of the invention in any of an LTE, NR, 5G and/or any standards based communication technologies being performed or discussed at the time of this application.

The gNB 170 is coupled via a link 131 to the NCE/MME/SGW/UDM/PCF/AMM/SMF/LMF/LMC 190. The link 131 may be implemented as, e.g., an S1 interface or N2 interface. The NCE/MME/SGW/UDM/PCF/AMM/SMF/LMF/LMC 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE/MME/SGW/UDM/PCF/AMM/SMF/LMF/LMC 190 to perform one or more operations. In addition, the NCE/MME/SGW/UDM/PCF/AMM/SMF/LMF/LMC 190, as are the other devices, is equipped to perform operations of such as by controlling the UE 110 and/or gNB 170 for 5G and/or NR operations in addition to any other standards operations implemented or discussed at the time of this application.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions and other functions as described herein to control a network device such as the UE 110, gNB 170, and/or NCE/MME/SGW/UDM/PCF/AMM/SMF/LMF/LMC 190 as in FIG. 8.

It is noted that functionality(ies), in accordance with example embodiments of the invention, of any devices as shown in FIG. 8 e.g., the UE 110 and/or gNB 170 can also be implemented by other network nodes, e.g., a wireless or wired relay node (a.k.a., integrated access and/or backhaul (IAB) node). In the IAB case, UE functionalities may be carried out by MT (mobile termination) part of the IAB node, and gNB functionalities by DU (Data Unit) part of the LAB node, respectively. These devices can be linked to the UE 110 as in FIG. 8 at least via the wireless link 111 and/or via the NCE/MME/SGW/UDM/PCF/AMM/SMF/LMF/LMC 190 using link 199 to Other Network(s)/Internet as in FIG. 8.

In general, various embodiments of the UE 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

As similarly stated above, a difference between operations as disclosed in this application and prior art at the time of this application is that in this application the UE is combining different portions of the CORESET/SIB1 across the search space occasions instead of combining different search space sets/candidate sets.

Figure 2:
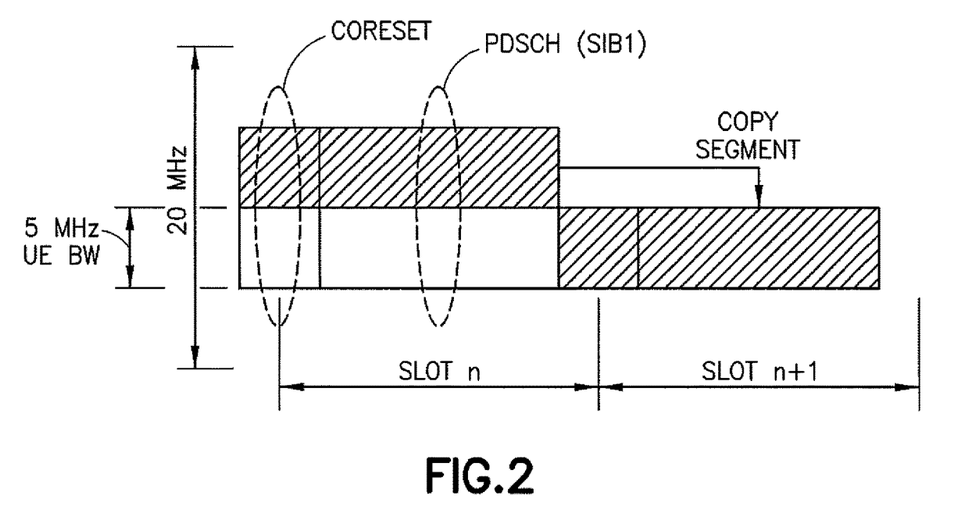
FIG. 2 shows an example of CORESET #0/SIB1 using 48 PRBs and 15 kHz SCS for 5 MHz UE.
Figure 3:
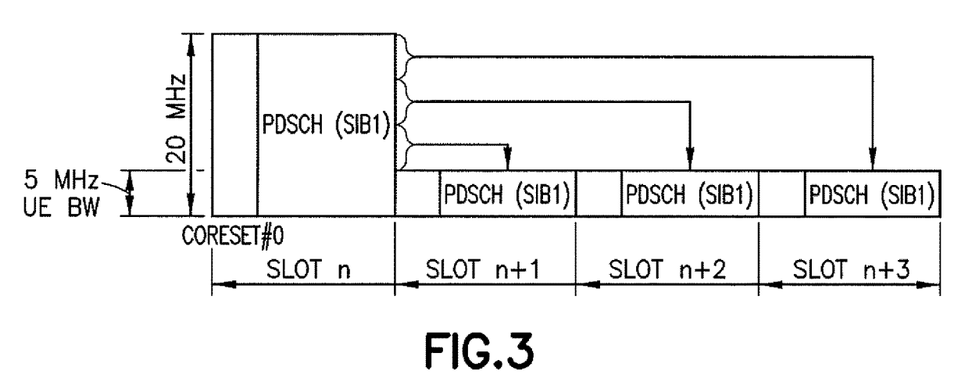
FIG. 3 shows an example of CORESET #0/SIB1 using 48 PRBs and 30 kHz SCS for 5 MHz UE.

Therefore, one differentiation is in FIG. 2 and FIG. 3 where there is re-mapping of a wideband CORESET/SIB1 into multiple narrowband parts for narrowband UE to receive and combine. It is noted that any reference to the terms narrowband and/or wideband as used herein, such as for segments, can relate to frequency operations, frequency ranges, and/or frequency range capabilities of a device as disclosed herein.

One idea in accordance with example embodiments of the invention is to provide several narrowband segments of the wideband CORESET and SIB spread over time such that they can be combined by the 5 MHz RedCap UE to arrive at the original wideband transmissions. This is illustrated in FIG. 2 where the CORESET and SIB (for example CORESET #0 and SIB1) spans 8.64 MHz (i.e., 48 PRBs with SCS of 15 kHz). In this case, the 5 MHz UE can receive only 24 PRBs in the first slot. So, in the second slot, the remaining 24 PRBs are sent the frequency range being monitored by the 5 MHz UE. The UE then combines the two segments together to arrive at the original transmission.

Some steps for doing this are described below:
Legacy indication of CORESET and corresponding SearchSpace is used to implicitly determine the PDCCH search space set for RedCap UE;
UE determines CORESET frequency range from the system configuration. For 5 MHz RedCap UE, the UE re-tunes to center frequency containing N PRBs of CORESET #starting from the lowest number PRB (e.g., based on frequency/time resource allocation provided in MIB_pdcch-ConfigSIB1):
For example, in 5 MHz, for fully overlapping CORESET, 4.32 MHZ usable BW contains N=24 at 15 kHz SCS, N=12 @ 30 kHz SCS;
If CORESET size=M PRBs, the CORESET for RedCap UE is limited to N PRBs and spread over M/N successive slots monitored by the UE for PDCCH configured for the corresponding SearchSpace:

Alternatively, when the configuration contains two search space sets per slot, the aggregation can utilize only one search space set in a slot or a higher periodicity,
For RedCap UE, the CCEs mapped to M PRBs in CORESET for legacy UE are re-mapped to N PRBs over M/N slots, and
PDCCH may be fully contained within N PRBs corresponding to one search space set for lower aggregation levels but may be spread across multiple slots for higher aggregation levels;
Example: CORESET fully overlaps with RedCap UE BWP:
For 15 kHz SCS for CORESET→N=24
M=24→can be supported
M=48→aggregated over 48/24=2 successive slots monitored by the UE for PDCCH, and
For 30 kHz SCS for CORESET→N=12
M=24→aggregated over 24/12=2 successive slots monitored by the UE for PDCCH
M=48→aggregated over 48/12=4 successive slots monitored by the UE for PDCCH;
Note that UE would need to keep the soft bits or LLRs from multiple slots in order to combine them after several slots.

FIG. 3 illustrates the re-mapping of CORESET #0 and SIB1 for 5 MHz UE when CORESET #0 of size 48 PRBs and 30 kHz SCS is configured.

Figure 4:
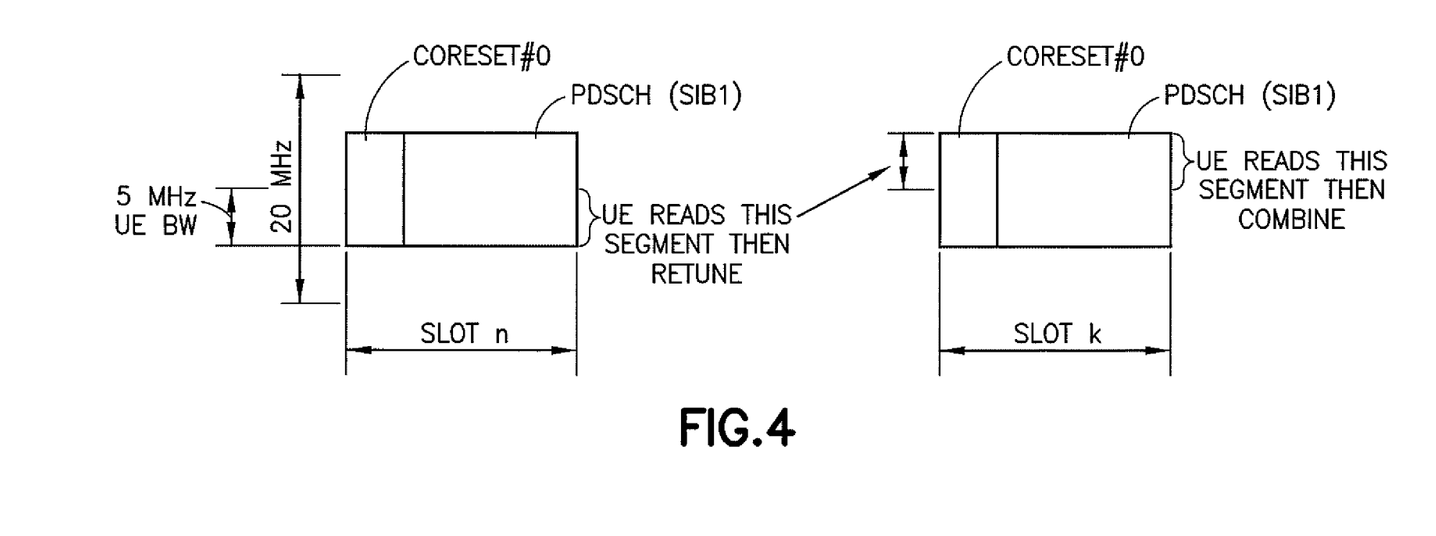
FIG. 4 shows an example of CORESET #0/SIB1 combining across search spaces with retuning.

Alternatively, the UE can combine transmissions over successive search spaces instead of slots. In this case, the gNB does not need to re-map the transmissions since the UE can re-tune to different frequency range to capture the additional PRBs. This is shown in FIG. 4. Although this method is simpler, some PRBs may be wasted as the gNB needs to transmit full copies in different search spaces.

Figure 5:
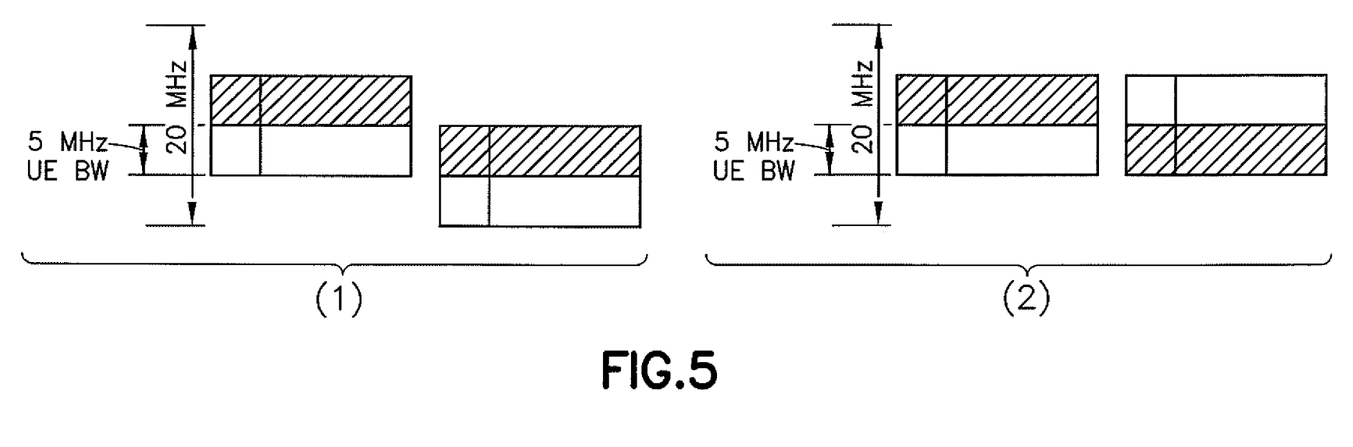
FIG. 5 shows an example of CORESET #0/SIB1 combining across search spaces without retuning.

Alternatively, the UE can combine transmissions over successive search spaces instead of slots together with gNB remapping of the transmissions. This is shown in FIG. 5. Note that this option is not backward-compatible as the CORESET #0 frequency locations/PRB mapping are changed across search spaces.

Note that since gNB is repeating CORESET/SIB Segments using PDSCH RBs which can otherwise be used for traffic, to partly compensate for this traffic loss, other Rel-18 non-RedCap UE can also make use of these repeated CORESET/SIB segments (i.e., Rel-18 non-RedCap UE or Rel-17 RedCap UE can combine all available CORESET #0/SIB1 transmissions), so they also would (1) save power by listening to only 5 MHz frequency range, or (2) improve CORESET/SIB demodulation accuracy.

Note that retuning may not be necessary if each of the N PRBs is self-decodable. In this case, an additional embodiment may be that each segment is identical (instead of different portion of the M PRBs).

In light of prior art at the time of this application, one differentiation in accordance with example embodiments of this invention is the re-mapping of a wideband CORESET/SIB1 into multiple narrowband parts for narrowband UE to receive and combine. This remapping is clear from network claim perspective and not covered in the prior art. But from a UE claim perspective operations may include receiving a first portion of the CORESET at a first time, receiving a second portion of the CORESET at a second time, etc., combining the portions together to form a PDCCH search space, and decoding the downlink control information from the search space.

Some of these Figures illustrate a message flow diagram for combining across multiple slots of the same search space (corresponding to a method as described in FIG. 2 and FIG. 3), while FIG. 3 illustrates the message flow diagram for combining across multiple search spaces (corresponding to a method as described in FIG. 4).

Figure 6:
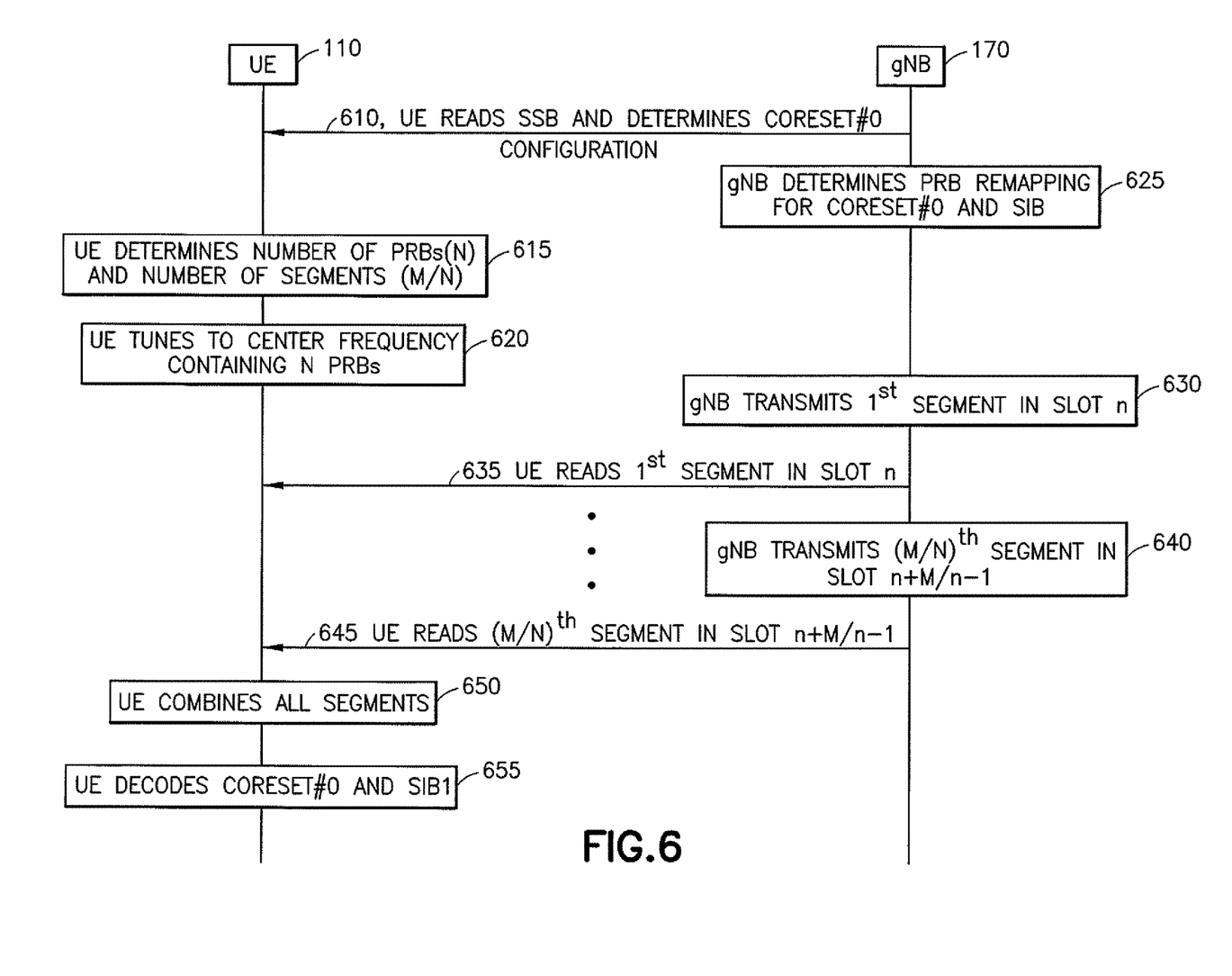
FIG. 6 shows a flow chart for reception of CORESET #0/SIB1 by 5 MHz UE across multiple slots of the same search space in accordance with example embodiments of the invention.

FIG. 6 shows a flow chart for communication of information between a gNB 170 and a UE 110 of CORESET #0/SIB1 by 5 MHz UE across multiple slots of the same search space in accordance with example embodiments of the invention.

As shown in step 610 of FIG. 6 the UE reads SSB and determines CORESET #0 configuration. At step 615 of FIG. 6 the UE determines number of PRBs(N) and number of segments (M/N). At step 620 the UE tunes to center frequency containing N PRBs. As shown in step 625 of FIG. 6 the gNB determines PRB remapping for CORESET and SIB. At step 630 of FIG. 6 the gNB transmits $1^{st}$ segment in slot n. At step 635 of FIG. 6 the UE reads the $1^{st}$ segment in slot n. At step 640 of FIG. 6 the gNB transmits $(M/N)^{th}$ segment in slot n+M/n−1. At step 645 the UE reads $(M/N)^{th}$ segment in slot n+M/n−1. At step 650 of FIG. 6 the UE combines all segments. Then at step 655 of FIG. 6 the UE decodes CORESET #0 and SIB1.

Figure 7:
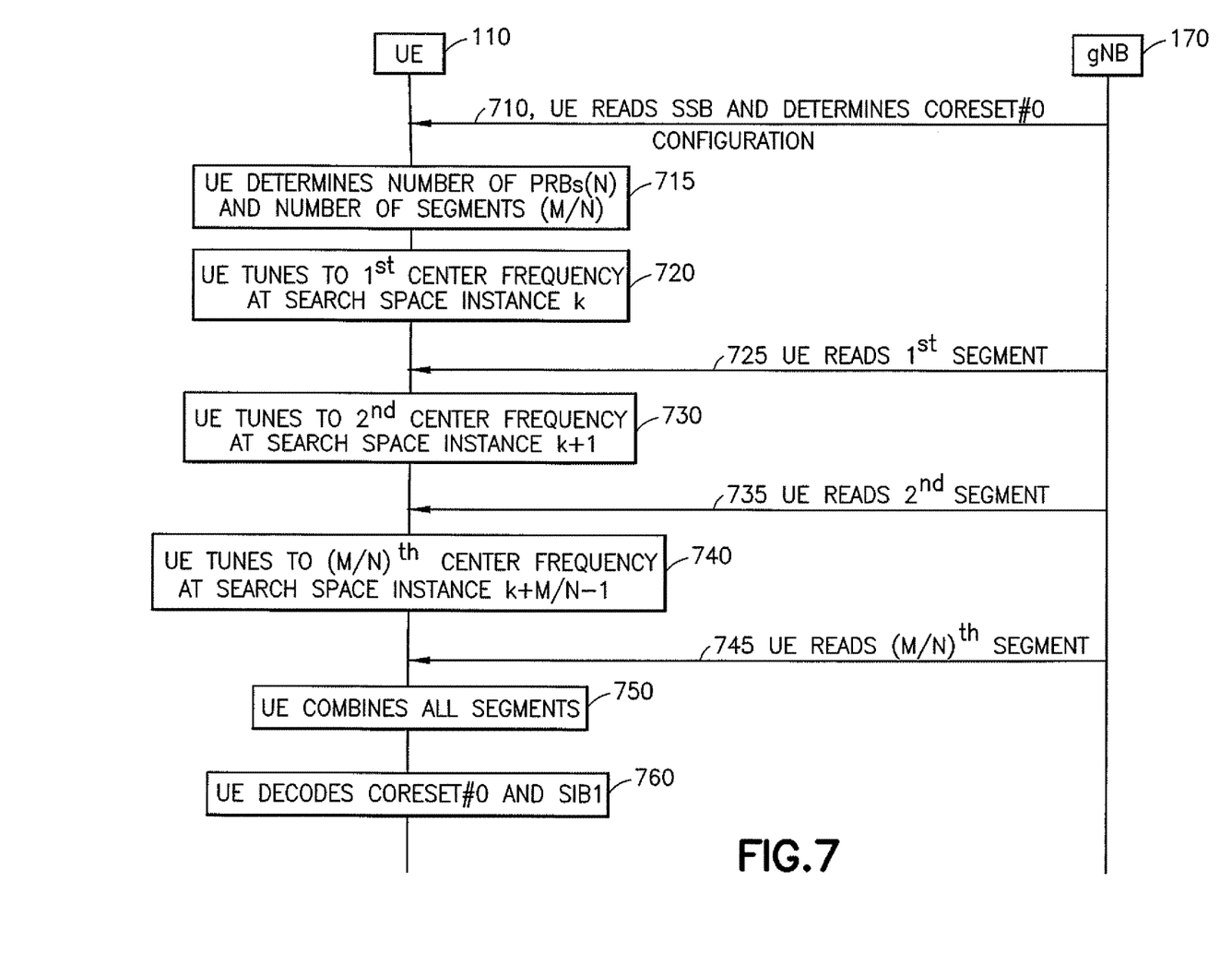
FIG. 7 shows a flow chart for reception of CORESET #0/SIB1 by 5 MHz UE across multiple search spaces in accordance with example embodiments of the invention.

FIG. 7 shows a flow chart for communication of information between a gNB 170 and a UE 110 of CORESET #0/SIB1 by 5 MHz UE across multiple search spaces in accordance with example embodiments of the invention.

As shown in step 710 of FIG. 7 the UE reads SSB and determines CORESET #0 configuration. At step 715 of FIG. 7 the UE determines number of PRBs (N) and number of segments (M/N). At step 720 the UE tunes to center frequency at search space instance k. As shown in step 725 of FIG. 7 the UE reads 1st segment. As shown in step 730 of FIG. 7 the UE tunes to $2^{nd}$ center frequency at search space instance k+1. As shown in step 735 of FIG. 7 the UE reads the $2^{nd}$ segment. As shown in step 740 of FIG. 7 the UE tunes to the $(M/N)^{th}$ center frequency at search space instance k+M/N−1. At step 745 of FIG. 7 the UE reads $(M/N)^{th}$ segment. As shown in step 750 of FIG. 7 the UE combines all segments. Then as shown in step 760 of FIG. 7 the UE decodes CORESET #0 and SIB1.

Figure 9A:
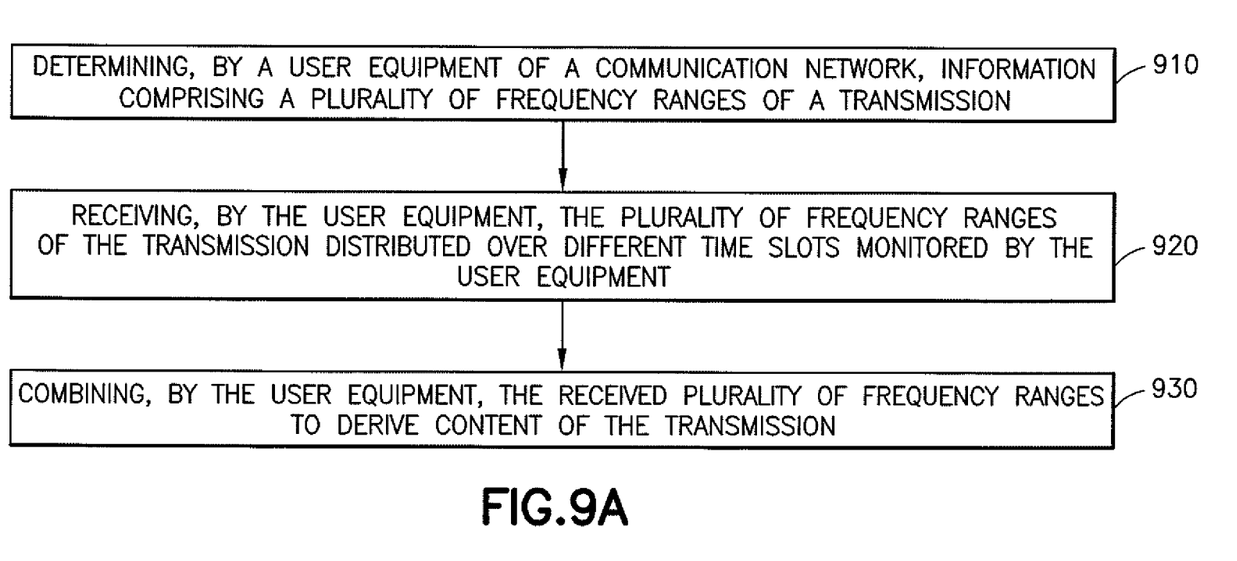
FIG. 9A and FIG. 9B each show a method in accordance with example embodiments of the invention which may be performed by an apparatus such as shown in FIG. 8.
Figure 9B:
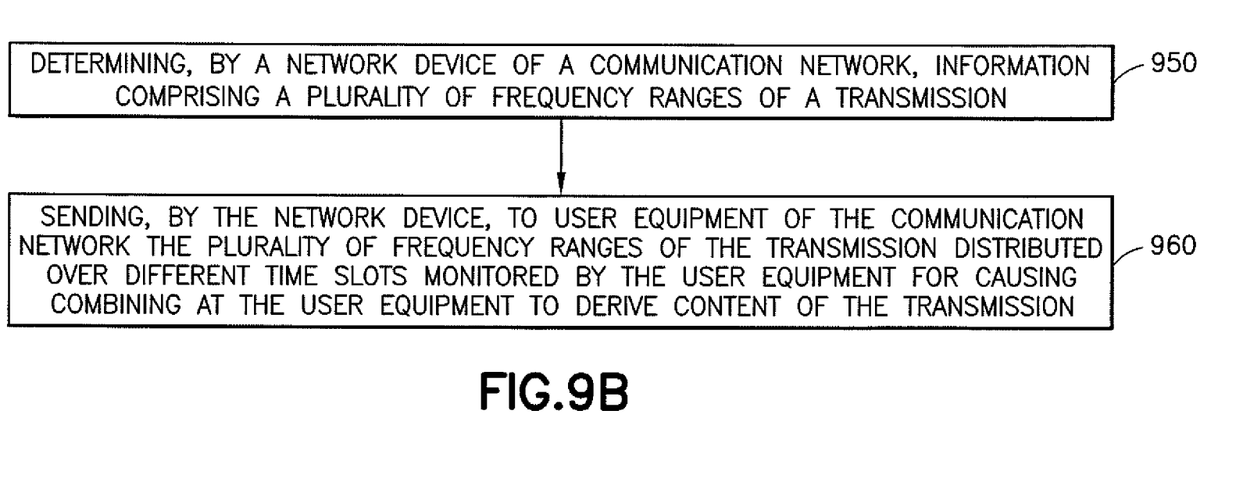

FIG. 9A and FIG. 9B each show a method in accordance with example embodiments of the invention which may be performed by an apparatus such as shown in FIG. 8.

FIG. 9A illustrates operations which may be performed by a device such as, but not limited to, a device (e.g., the UE 10 as in FIG. 8). As shown in step 910 of FIG. 9A there is determining, by a user equipment of a communication network, information comprising a plurality of frequency ranges of a transmission. As shown in step 920 of FIG. 9A there is receiving, by the user equipment, the plurality of frequency ranges of the transmission distributed over different time slots monitored by the user equipment. Then as shown in step 9930 of FIG. 9A there is combining, by the user equipment, the received plurality of frequency ranges over the different time slots to derive content of the transmission.

In accordance with the example embodiments as described in the paragraph above, wherein content of the transmission comprises a physical downlink control channel for scheduling a physical downlink shared channel and the physical downlink shared channel, and wherein the different time slots are consecutive or non-consecutive to one another.

In accordance with the example embodiments as described in the paragraphs above, wherein determining the information comprising the plurality of frequency ranges depends on a control resource set indicated in system information, at least one search space indicated in the system information, and a bandwidth of the user equipment, where a bandwidth of the control resource set is larger than the bandwidth of the user equipment.

In accordance with the example embodiments as described in the paragraphs above, wherein the determining comprises determining a number of the plurality of frequency ranges as M/N, wherein the plurality of the frequency ranges are aggregated over different time periods that may be consecutive or non-consecutive to one another, wherein M is based on the indication in the system information, and wherein N is known to the user equipment.

In accordance with the example embodiments as described in the paragraphs above, wherein determining the information comprising the plurality of frequency ranges comprises: determining control channel elements mapped to the M physical resource blocks in the control resource set; determining a frequency range of M physical resource blocks from the system information for the control resource set; and determining frequency range of N physical resource blocks, wherein N is based on the bandwidth of the user equipment, within the frequency range of M physical resource blocks.

In accordance with the example embodiments as described in the paragraphs above, wherein the plurality of frequency ranges is received in a successive more than one search space spread over more than one slot.

In accordance with the example embodiments as described in the paragraphs above, wherein based on the successive more than one search space being in a single slot the user equipment is utilizing one search space in the single slot or the successive more than one search space at a higher periodicity.

In accordance with the example embodiments as described in the paragraphs above, wherein a physical downlink control channel is fully contained within a single narrowband segment corresponding to one search space of the successive more than one search space for lower aggregation levels.

In accordance with the example embodiments as described in the paragraphs above, wherein the plurality of frequency ranges is corresponding to the successive more than one search space and are spread across the more than one slot for higher aggregation levels.

In accordance with the example embodiments as described in the paragraphs above, wherein the combining comprises tuning to a different frequency range of the successive more than one search space to capture additional frequency ranges.

In accordance with the example embodiments as described in the paragraphs above, wherein the tuning is to a center frequency of a frequency range starting from a lowest number physical resource block of the physical resource blocks.

In accordance with the example embodiments as described in the paragraphs above, wherein the tuning to the center frequency of a frequency range is at a search space instance that is one of k+1 or k+M/N−1, wherein k, M, and N are integers.

In accordance with the example embodiments as described in the paragraphs above, wherein the tuning is based on at least one of a frequency or time resource allocation provided in the plurality of frequency ranges.

In accordance with the example embodiments as described in the paragraphs above, wherein the plurality of frequency ranges is received from a network node of the communication network.

A non-transitory computer-readable medium (Memory (ies) 125 as in FIG. 8) storing program code (Computer Program Code 123 and/or Search Space Module 140-2 as in FIG. 8), the program code executed by at least one processor (Processors 120 and/or Search Space Module 140-1) to perform the operations as at least described in the paragraphs above.

In accordance with an example embodiment of the invention as described above there is an apparatus comprising: means for determining (one or more transceivers 130, Memory(ies) 125, Computer Program Code 123 and/or Search Space Module 140-2, and Processors 120 and/or Search Space Module 140-1 as in FIG. 8), by a user equipment of a communication network, information comprising a plurality of frequency ranges of a transmission; means for receiving (one or more transceivers 130, Memory (ies) 125, Computer Program Code 123 and/or Search Space Module 140-2, and Processors 120 and/or Search Space Module 140-1 as in FIG. 8), by the user equipment, the plurality of frequency ranges of the transmission distributed over different time slots monitored by the user equipment; and means for combining (one or more transceivers 130, Memory(ies) 125, Computer Program Code 123 and/or Search Space Module 140-2, and Processors 120 and/or Search Space Module 140-1 as in FIG. 8), by the user equipment, the received plurality of frequency ranges over time slots to derive content of the transmission.

In the example aspect of the invention according to the paragraph above, wherein at least the means for determining, receiving, and combining comprises a non-transitory computer readable medium [Memory(ies) 125 as in FIG. 8] encoded with a computer program [Computer Program Code 123 and/or Search Space Module 140-2 as in FIG. 8] executable by at least one processor [Processors 120 and/or Search Space Module 140-1 as in FIG. 8].

FIG. 9B illustrates operations which may be performed by a network device such as, but not limited to, a network node eNB/gNB 170 as in FIG. 8 or a base station. As shown in step 950 of FIG. 9B there is determining, by a network device of a communication network, information comprising a plurality of frequency ranges of a transmission. Then as shown in step 960 of FIG. 9B there is sending, by the network device, to user equipment of the communication network the plurality of frequency ranges of the transmission distributed over different time slots monitored by the user equipment for causing combining at the user equipment to derive content of the transmission.

In accordance with the example embodiments as described in the paragraph above, wherein the content of the transmission comprises a physical downlink control channel for scheduling a physical downlink shared channel and the physical downlink shared channel, and wherein the different time slots are consecutive or non-consecutive to one another.

In accordance with the example embodiments as described in the paragraphs above, wherein determining the information comprising the plurality of frequency ranges depends on a control resource set indicated in system information, at least one search space indicated in the system information, and a bandwidth of the control resource set, where a bandwidth of the control resource set is larger than the bandwidth of the user equipment.

In accordance with the example embodiments as described in the paragraphs above, wherein the determining comprises determining a number of the plurality of frequency ranges as M/N, wherein the plurality of the frequency ranges are aggregated over different time periods that may be consecutive or non-consecutive to one another, wherein M is based on the indication in the system information, and wherein the N is known to the user equipment.

In accordance with the example embodiments as described in the paragraphs above, wherein determining the information comprising the plurality of frequency ranges comprises: determining control channel elements mapped to the M physical resource blocks in the control resource set; determining a frequency range of M physical resource blocks from the system information for the control resource set; and determining frequency range of N physical resource blocks, wherein N is based on the bandwidth of the user equipment, within the frequency range of M physical resource blocks.

In accordance with the example embodiments as described in the paragraphs above, wherein the plurality of frequency ranges is transmitted in a more than one search space of the at least one search space spread over more than one slot.

In accordance with the example embodiments as described in the paragraphs above, wherein based on the successive more than one search space being in a single slot one search space is for utilization in the single slot or the successive more than one search space is for utilization at a higher periodicity.

In accordance with the example embodiments as described in the paragraphs above, wherein a physical downlink control channel is fully contained within a single narrowband segment corresponding to one search space of the successive more than one search space for lower aggregation levels.

In accordance with the example embodiments as described in the paragraphs above, wherein the plurality of frequency ranges is corresponding to the successive more than one search space and are spread across the more than one slot for higher aggregation levels.

In accordance with the example embodiments as described in the paragraphs above wherein the information is causing tuning to a different frequency range of the successive more than one search space to capture additional frequency ranges.

In accordance with the example embodiments as described in the paragraphs above, wherein the tuning is based on at least one of a frequency or time resource allocation provided in the plurality of frequency ranges.

In accordance with the example embodiments as described in the paragraphs above, wherein the plurality of frequency ranges is transmitted from the network node to the user equipment.

In accordance with the example embodiments as described in the paragraphs above, wherein system information is transmitted over the physical downlink shared channel.

A non-transitory computer-readable medium (Memory (ies) 155 as in FIG. 8) storing program code (Computer Program Code 153 and/or Search Space Module 150-2 as in FIG. 8), the program code executed by at least one processor (Processors 152 and/or Search Space Module 150-1) to perform the operations as at least described in the paragraphs above.

In accordance with an example embodiment of the invention as described above there is an apparatus comprising: means for determining, by a network device of a communication network, information comprising a plurality of frequency ranges of a transmission; then means for sending, by the network device, to user equipment of the communication network the plurality of frequency ranges of the transmission distributed over different time slots for causing combining at the user equipment to derive content of the transmission.

In the example aspect of the invention according to the paragraph above, wherein at least the means for determining and sending comprises a non-transitory computer readable medium [Memory(ies) 155 as in FIG. 8] encoded with a computer program [Computer Program Code 153 and/or Search Space Module 150-2 as in FIG. 8] executable by at least one processor [Processors 152 and/or Search Space Module 150-1 as in FIG. 8].

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:
  (a) hardware-only circuit implementations (such as implementations in only analog and/or digital circuitry);
  (b) combinations of hardware circuits and software, such as (as applicable):
    (i) a combination of analog and/or digital hardware circuit(s) with software/firmware; and
    (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
  (c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this 'circuitry' as may be used herein refers to at least the following:
  (a) hardware-only circuit implementations (such as implementations in only analog and/or digital circuitry); and
  (b) to combinations of circuits and software (and/or firmware), such as (as applicable): (i) to a combination of processor(s) or (ii) to portions of processor(s)/ software (including digital signal processor(s)), software, and memory(ies) that work together to cause an apparatus, such as a mobile phone or server, to perform various functions); and
  (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
   at least one processor; and
   at least one non-transitory memory, where the at least one non-transitory memory is storing instructions, that when executed by the at least one processor cause the apparatus to at least:
   determine, by a user equipment of a communication network, information comprising a plurality of frequency ranges of a transmission;
   receive, by the user equipment, the plurality of frequency ranges of the transmission distributed over different time slots monitored by the user equipment; and
   combine over at least two successive search spaces indicated in system information, by the user equipment, the received plurality of frequency ranges to derive content of the transmission.

2. The apparatus of claim 1, wherein content of the transmission comprises a physical downlink control channel for scheduling a physical downlink shared channel and the physical downlink shared channel, and wherein the different time slots are consecutive or non-consecutive to one another.

3. The apparatus of claim 2, wherein determining the information comprising the plurality of frequency ranges depends on a control resource set indicated in the system information, at least one search space indicated in the system information, and a bandwidth of the user equipment, wherein a bandwidth of the control resource set is larger than the bandwidth of the user equipment.

4. The apparatus of claim 3, wherein the determining comprises determining a number of the plurality of frequency ranges as M/N, wherein the plurality of the frequency ranges are aggregated over different time periods monitored by the user equipment that may be consecutive or non-consecutive to one another wherein M is based on the indication in the system information, and wherein N is known to the user equipment.

5. The apparatus of claim 4, wherein determining the information comprising the plurality of frequency ranges comprises:
   determining control channel elements mapped to the M physical resource blocks in the control resource set;
   determining a frequency range of M physical resource blocks from the system information for the control resource set; and
   determining frequency range of N physical resource blocks, wherein N is based on the bandwidth of the user equipment, within the frequency range of M physical resource blocks.

6. The apparatus of claim 1, wherein the plurality of frequency ranges are received in a successive more than one search space spread over more than one slot.

7. The apparatus of claim 6, wherein based on the successive more than one search space being in a single slot the user equipment is utilizing one search space in the single slot or the successive more than one search space at a higher periodicity.

8. The apparatus of claim 6, wherein a physical downlink control channel is fully contained within a single narrowband segment corresponding to one search space of the successive more than one search space for lower aggregation levels.

9. The apparatus of claim 6, wherein the plurality of frequency ranges are corresponding to the successive more than one search space and are spread across the more than one slot for higher aggregation levels.

10. The apparatus of claim 6, wherein the combining comprises tuning to a different frequency range of the successive more than one search space to capture additional frequency ranges.

11. The apparatus of claim 10, wherein the tuning is to a center frequency of a frequency range starting from a lowest number physical resource block of the physical resource blocks.

12. The apparatus of claim 11, wherein the tuning to the center frequency of a frequency range is at a search space instance that is one of k+1 or k+M/N−1, wherein k, M, and N are integers.

13. The apparatus of claim 10, wherein the tuning is based on at least one of a frequency or time resource allocation provided in the plurality of frequency ranges.

14. The apparatus of claim 1, wherein the plurality of frequency ranges is received from a network node of the communication network.

15. A method, comprising:
   determining, by a user equipment of a communication network, information comprising a plurality of frequency ranges of a transmission;
   receiving, by the user equipment, the plurality of frequency ranges of the transmission distributed over different time slots monitored by the user equipment; and
   combining over at least two successive search spaces indicated in system information, by the user equipment, the received plurality of frequency ranges to derive content of the transmission.

16. An apparatus comprising:
   at least one processor; and
   at least one non-transitory memory, where the at least one non-transitory memory is storing instructions, that when executed by the at least one processor cause the apparatus to at least:
   determine, by a network device of a communication network, information comprising a plurality of frequency ranges of a transmission; and
   send, by the network device, to user equipment of the communication network the plurality of frequency ranges of the transmission distributed over different time slots monitored by the user equipment for causing combining at the user equipment to derive content of the transmission over at least two successive search spaces.

17. The apparatus of claim 16, wherein the content of the transmission comprises a physical downlink control channel for scheduling a physical downlink shared channel and the physical downlink shared channel, and wherein the different time slots are consecutive or non-consecutive to one another.

18. The apparatus of claim 17, wherein determining the information comprising the plurality of frequency ranges depends on a control resource set indicated in a system information, at least one search space indicated in the system information, and a bandwidth of the control resource set, where a bandwidth of the control resource set is larger than the bandwidth of the user equipment.

19. The apparatus of claim 18, wherein the determining comprises determining a number of the plurality of frequency ranges as M/N, wherein the plurality of the frequency ranges are aggregated over different time periods monitored by the user equipment that may be consecutive or non-consecutive to one another, wherein M is based on the indication in the system information, and wherein the N is known to the user equipment.

20. The apparatus of claim 19, wherein determining the information comprising the plurality of frequency ranges comprises:
- determining control channel elements mapped to the M physical resource blocks in the control resource set;
- determining a frequency range of M physical resource blocks from the system information for the control resource set; and
- determining frequency range of N physical resource blocks, wherein N is based on the bandwidth of the user equipment, within the frequency range of M physical resource blocks.

* * * * *